Figure 2A:
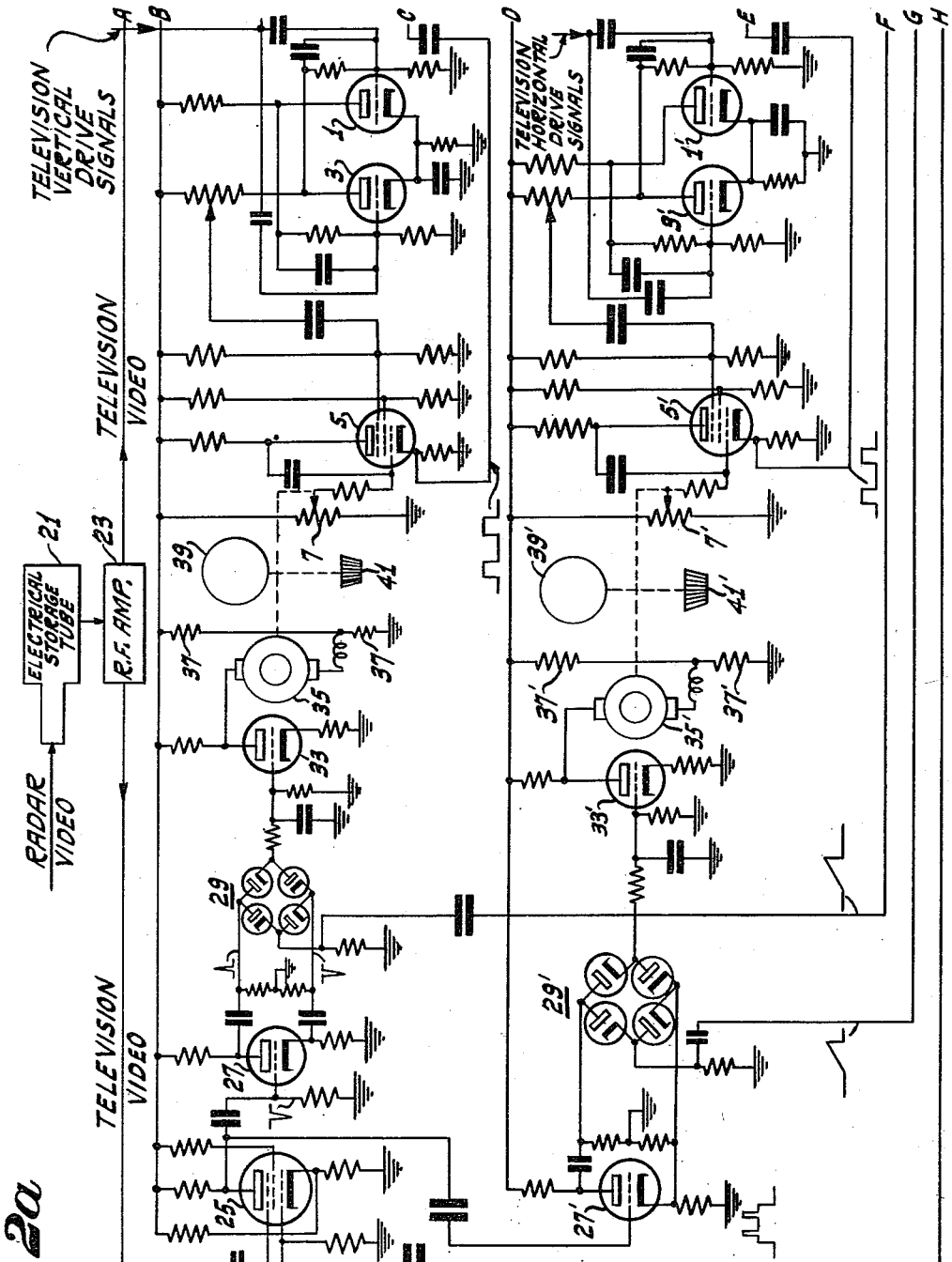

Dec. 18, 1956  R. E. BAKER ET AL  2,774,964
AUTOMATIC RADAR TARGET TRACKING SYSTEM
Filed April 28, 1951  2 Sheets-Sheet 1
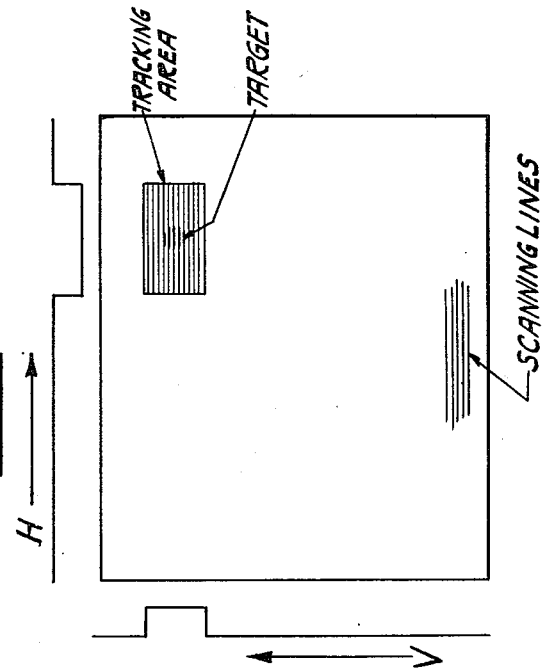
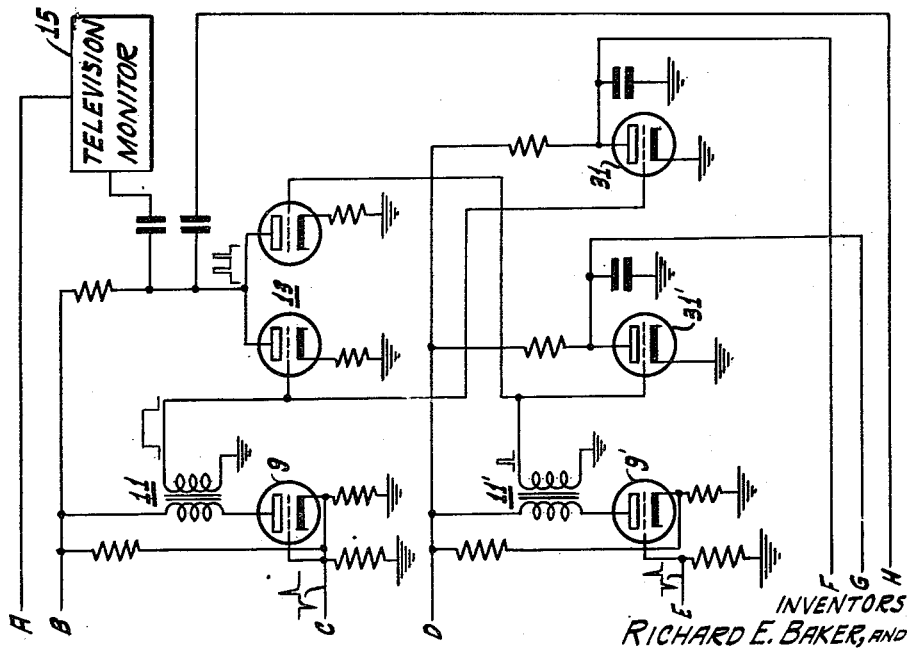
INVENTORS
RICHARD E. BAKER, AND
FRANK D. COVELY
BY
ATTORNEY

United States Patent Office 2,774,964
Patented Dec. 18, 1956

2,774,964

AUTOMATIC RADAR TARGET TRACKING SYSTEM

Richard E. Baker, Indianapolis, Ind., and Frank D. Covely, Collingswood, N. J., assignors to Radio Corporation of America, a corporation of Delaware Application April 28, 1951, Serial No. 223,508

5 Claims. (Cl. 343—7.3)

This invention relates to a radar target tracking system in which a selected moving target is manually centered within a generated target tracking display area and automatically remains centered therein as the display area tracks said moving target.

It is an object of the instant invention to provide an improved automatic radar target tracking system.

Another object of the invention is to provide an automatic target tracking system in which there is a visual indication of selective radar target tracking.

A further object of the invention is to provide an improved automatic radar target tracking system utilizing a converter type storage tube.

According to the present invention, received PPI radar video signals containing target information in polar coordinates are converted into television video signals representing information in rectangular coordinates by means of a suitable signal converter storage tube. These television video signals are simultaneously coupled to a television monitor kinescope and to a video amplifier. The signals coupled to and displayed by the monitor scope provide a television picture in rectangular coordinates of the radar system PPI display.

Auxiliary circuitry actuated by television system horizontal and vertical drive signals generate a small target tracking area which is also displayed on the television monitor. The tracking area is manually positioned such that a selected target to be tracked is centered therein. As the target moves, appropriate video signals are coupled to the before mentioned video amplifier, the output of which subsequently produces suitable wave signals causing the tracking area to automatically track the selected target. The generated target area appears on the television monitor as an intensification of its scanning beam while the selected target centered therein appears as a further beam modulation.

The invention will be described in greater detail with reference to the accompanying drawing of which:

Fig. 1 is a television picture of a radar system PPI display in which a rectangular target tracking area, generated according to the invention, tracks a selected moving target; and Figs. 2–a and 2–b together comprise a schematic circuit diagram of an automatic target tracking system, according to the invention.

*Tracking area generator*

Television system vertical and horizontal drive signals are utilized for producing a small rectangular target tracking area which is positioned about a selected target to be tracked. For simplicity in describing the structure and operation of the herein disclosed invention and because of the similarity of circuitry actuated by these drive signals, the vertical signal channel is here considered.

Referring to Fig. 2, television system vertical drive signals are applied to a pair of half-frequency multivibrators 1, 3 one of which multivibrators 3 produces a wave signal output having a repetition rate equal to one-half the vertical drive signal repetition rate. This multivibrator output is applied to and drives a phanastron type pulse generator 5 substantially as shown and described in vol. 19, pages 203–204 of the M. I. T. Radiation Laboratory Series. The phanastron 5 produces a substantially square wave output pulse signal which is time-phased by means of a time delay potentiometer 7 located in the phanastron grid circuit. The square wave signal is differentiated and applied to a pulse former circuit 9. The anode circuit of the pulse former includes a blocking oscillator 11 from which a square wave gating signal is derived and successively coupled to a gate mixer 13 and to a television monitor kinescope 15.

Similar circuitry designated by primes, is responsive to television system horizontal drive signals and generates a second gating signal which when combined with the vertical gating signal applied to the above-mentioned gate mixer 13 provides a threshold type mixed gating signal enabling the signal circuits of the monitor kinescope 15.

The pulse former signal outputs for both the vertical and horizontal signal channels are adjusted to provide output pulses of sufficient width such that when combined as above described they periodically increase the intensity of the kinescope electron beam and produce a rectangular tracking area of desired size and shape, as illustrated in Fig. 1.

*Video signal presentation*

Referring again to Fig. 2, a radar video signal corresponding to a selected target obtained from a PPI radar system (not shown) is converted into a television video signal in an electrical storage tube 21, substantially as described in a copending application Serial No. 29,746, filed May 28, 1948, by L. Pensak and entitled Electrical Storage Tube. The television video signals therein derived are amplified in an R.—F. amplifier 23 and are simultaneously coupled to the signal circuits, the television kinescope 15 and to a coincidence video amplifier 25. The video signals applied to the kinescope provide a television picture of PPI radar target indications.

The video target to be tracked is selected by manually varying the delay times of the vertical and horizontal phanastron circuits thereby centering a selected target within the generated rectangular tracking area. With the target centered, the threshold signal utilized in the Tracking Area Generator (for enabling the monitor kinescope 15) gates the television video signal corresponding to the selected target and produces an output pulse from the coincidence video amplifier 25.

The gated video pulse is applied to both the vertical and horizontal signal channels. Considering again only the vertical channel, the video pulse is applied to a phase splitting bi-phase amplifier 27 from which a pair of oppositely polarized pulse signals are derived and applied to diagonally opposite legs of a bridge-type phase discriminator 29.

The vertical pulse component of the threshold type mixed gating signal which is utilized in the Tracking Area Generator is applied to a sawtooth generator 31, the output of which is also applied to the phase discriminator 29.

The composite signal, which comprises the selected video target signal centered on a sawtooth wave signal thus applied to the discriminator 29 gates an output signal therefrom which is amplified in a motor control amplifier 33. The output circuit of the motor control amplifier includes a small D.-C. motor 35 one terminal of which is connected to the amplifier anode. The remaining motor terminal is connected to a resistive bleeder network 37. The motor 35 is mechanically geared to the phanastron time-phasing potentiometer 7, remote synchro elements 39, and to a manual motor control member 41.

System operation

The generation and presentation of the rectangular target tracking area and the presentation of video signals on the monitor scope 15 have previously been described. To track a selected target, the equipment operator adjusts the manual motor control devices 41 and 41' in both the vertical and horizontal signal channels. Proper adjustment of the manual control members varies the setting of the associated phanastron delay potentiometers 7 and 7' mechanically coupled thereto. The vertical and horizontal gating signals subsequently obtained then produce on the kinescope 15 a tracking area in which the selected target is centered.

With the target centered within the tracking area, the motor control amplifier anode potentials are respectively equal to the resistive bleeder network potentials wherein the remaining terminals of the D.-C. motors 35 and 35' are connected, hence no potential difference exists across the motor and there is no motor rotation.

If the target tends to move such that the video output signals from both bi-phase and amplifiers 27 and 27' appear earlier on their respective sawtooth wave signals (which are applied to associated phase discriminators, 29 and 29') the anode voltages of the motor control amplifiers 33 and 33' increases. The potential difference between the pairs of terminals of each motor 35 and 35' cause motor rotation until the phanastron delay potentiometers 7 and 7' geared thereto time-phase the phanastrons such that the tracking area tracks the target and the target remains centered therein.

In like manner, movement of the target in the opposite direction causes corresponding video signals to appear later upon the sawtooth wave signals, the motor is then caused to rotate in the opposite direction until the target is again centered within the target tracking area.

Summary

The present invention thus provides an improved automatic radar target tracking system in which improved tracking is obtained by means of novel circuitry which includes a signal converter electrical storage tube. A visual indication of selective target tracking is also obtained by monitoring on a kinescope the television output signals obtained from the storage tube.

The half-frequency multivibrators, which drive the phanastrons, are necessary in the event that interlaced scanning is desired. If the vertical and horizontal delay phanastrons were driven at the field rate, the horizontal gate pulses would appear at different times with respect to the vertical gate pulses on alternate television fields. Also the half-frequency multivibrators enable the tracking area to be moved, without instability, to the extreme edges of the kinescope display.

The synchros which are geared to the D.-C. drive motors provide outputs which may be applied to remote station equipment for gunfire or other control. Rate of change information also may be fed to computers.

What we claim to be our invention is:

1. A system for automatically tracking a moving radar target for use with a radar system which records the positional location of radar targets within its service area comprising, means for producing an electrical charge pattern representative of the ranges and azimuths of said radar targets, means coupled to said charge pattern producing means for generating signals for producing in said charge pattern an area of charge which surrounds an image in said charge pattern corresponding to a radar target to be tracked, and means responsive to movement of said target for controlling said signal generating means to maintain said image positioned within said area of charge.

2. A system as claimed in claim 1 for use with a television system utilizing interlaced scanning wherein said raster generating means includes a pair of multivibrators producing a single output wave signal in response to alternate input wave signals applied thereto.

3. A system as claimed in claim 2 wherein output wave signals derived from said multivibrators drive a substantially square wave generator, said square wave generator including time phasing means modulated by said selected moving target.

4. A system as claimed in claim 3 wherein said time-phasing means is mechanically controlled by motor means actuated in response to movement of said selected target.

5. A system for automatically tracking a moving radar target for use with a radar system which records the positional location of radar targets within its service area comprising, means for producing a visual display including the ranges and bearings of said radar targets, means for generating and inserting a raster area into said display, the size of said raster area being small compared to the size of said display, means for initially positioning said raster area in said display so that an image in said display corresponding to a selected radar target to be tracked is within the bounds of said raster, and means responsive to movement of said radar target for maintaining said image within the bounds of said raster.

References Cited in the file of this patent

UNITED STATES PATENTS

| | | |
|---|---|---|
| 2,415,981 | Wolff | Feb. 18, 1947 |
| 2,455,265 | Norgaard | Nov. 30, 1948 |
| 2,500,633 | Edwards | Mar. 14, 1950 |
| 2,502,317 | Ewing | Mar. 28, 1950 |
| 2,508,384 | Gross | May 23, 1950 |
| 2,524,295 | Mesner | Oct. 3, 1950 |
| 2,528,202 | Wolff | Oct. 31, 1950 |
| 2,572,986 | Chance | Oct. 30, 1951 |